United States Patent [19]
Gustafson

[11] Patent Number: 5,756,986
[45] Date of Patent: May 26, 1998

[54] ELECTRONIC MARKING DEVICE FOR RECOGNITION OF A PIECE OF TEXTILE

[76] Inventor: Ake Gustafson, Route Champ Thomas, CH-1618 Châtel-St-Denis, Switzerland

[21] Appl. No.: 525,733

[22] PCT Filed: Mar. 21, 1994

[86] PCT No.: PCT/EP94/00893

§ 371 Date: Nov. 16, 1995

§ 102(e) Date: Nov. 16, 1995

[87] PCT Pub. No.: WO94/24642

PCT Pub. Date: Oct. 27, 1994

[30] Foreign Application Priority Data

Apr. 14, 1993 [EP] European Pat. Off. .......... 93810267

[51] Int. Cl.[6] ........................................... G06K 19/06
[52] U.S. Cl. ..................................... 235/492; 235/487
[58] Field of Search ............................ 235/383, 384, 235/462, 491, 492, 493, 487; 340/572

[56] References Cited

U.S. PATENT DOCUMENTS

| | | | |
|---|---|---|---|
| 3,810,147 | 5/1974 | Lichtblau | 340/572 |
| 3,913,912 | 10/1975 | Lichtblau | 29/592.1 |
| 4,498,076 | 2/1985 | Lichtblau | 340/572 |
| 4,692,604 | 9/1987 | Billings . | |
| 4,728,938 | 3/1988 | Kaltner | 340/572 |
| 4,999,742 | 3/1991 | Stampfli . | |
| 5,059,951 | 10/1991 | Kaltner | 235/383 X |
| 5,313,052 | 5/1994 | Watanabe et al. | 235/384 X |

FOREIGN PATENT DOCUMENTS

| | | |
|---|---|---|
| 0 180 380 | 5/1986 | European Pat. Off. . |
| 0 376 062 | 7/1990 | European Pat. Off. . |
| 0 481 776 | 4/1992 | European Pat. Off. . |
| 3212039 | 10/1983 | Germany . |
| 57-209578 | 12/1982 | Japan . |

OTHER PUBLICATIONS

Database WPI, AN 91-052404, week 9108, Derwent Publications Ltd., London, GB; & DK-A-890002644 (J.F. Bjernson et al.) see abstract.

*Primary Examiner*—Donald T. Hajec
*Assistant Examiner*—Karl Frech
*Attorney, Agent, or Firm*—Oliff & Berridge, PLC

[57] ABSTRACT

A marking device includes an electronic part, made up of an electronic circuit and an antenna, in the form of a winding, which is fixed to a support part, which is a portion of a strip of a flexible material, and which is covered with at least one layer of a thermoplastic, thermoadhesive or self-adhering material. By applying the device to a garment and, by employing a separate electronic mechanism to enter electronic data into a memory of the electronic circuit, it is possible to identify the garment, thus marked, with the aid of a code-reading apparatus of the separate electronic mechanism.

10 Claims, 1 Drawing Sheet

ELECTRONIC MARKING DEVICE FOR RECOGNITION OF A PIECE OF TEXTILE

BACKGROUND OF THE INVENTION

1. Field of the Invention

The present invention relates to an electronic marking device, intended most particularly but not exclusively for the recognition of pieces of clothing.

2. Description of Related Art

Establishments using numerous personnel, this personnel having to wear particular work clothes, as for example white coats for hospital personnel or overalls or other protective clothes for the personnel of certain factories, are generally customers of a firm renting out work clothes, this firm generally also being able to ensure regularly the cleaning and repair of these clothes.

It is necessary for the establishments using these clothes, as well as for those renting out and/or repairing them, to be able to recognize each of the garments individually, mainly after the latter have been laundered and/or repaired. Actually, first of all the rental firm may have rented the same type of garment to several establishments; it is therefore necessary for each garment to be routed to its own holder, the garment in question generally being adapted to the function and the size of the latter, and finally the wearer of the work garment is generally glad to know that the garment he receives is the same as the one he had sent to be cleaned. The problem of recognition is still more complicated when the user establishment rents work clothes from several rental firms, or when the latter does not ensure the upkeep but when the laundering is ensured by one or more other different firms. It is therefore necessary for each garment to be marked individually and bear is ensured by one or more other different firms. It is therefore necessary for each garment to be marked individually and bear indications relating to the rental firm, to the using establishment, as well as to the holder of the garment, indications concerning the cleaning and repair firm or the department in which the holder works also being able to appear in the marking. The above indications further serve for a knowledge of the stocks of clothes, their circulation, and may facilitate the various invoicing of services rendered.

Generally, the necessary indications appear on a label fixed permanently or detachably to the garment and bearing these indications in plain form or encoded, for example an alphanumeric code or a bar code. In order to avoid manipulations and disputes, it is advantageous for the label to be fixed permanently to the garment, but in this case the marking appearing on the label may disappear after one or more laundering operations, depending upon the conditions and the products used for laundering. The presence of the label, according to the material used for the latter, may also hinder the cleaning operations, particularly the final ironing of the garment. Moreover, in case of changing one of the elements of the code, it is necessary to change the label, which may be long and costly in the event that engraving is to be carried out. But the major drawback resides in the fact that for each allocation of the garment in question, it is necessary to find its label and to read it, which increases the number of manipulations.

The application EP-A-0 376 062, which is considered to be the closest prior art, describes an electronic ciruit composed of an integrated circuit chip comprising a memory, connected to the two ends of a wire of a winding. This circuit is intended to be integrated into a rigid object, as for example a card of the credit card type or a key. In view of the rigidity and the use of the support object, the constraints of flexibility and of behavior at temperatures required for this device, especially for its fixing to the support object, are essentially different from those necessary for the device according to the invention.

A first object of the invention is therefore to propose a device for marking with a code, capable of being read by electronic means and capable of being garment having to undergo cleaning operations at high temperature and/or using noxious products.

Another object of the invention is to propose a device, the code of which may be read remotely, without its being necessary to manipulate or open the garment.

Still another object of the invention is to propose a device, the code of which may be modified by electronic means, without its being necessary to remove the device.

These different objects are achieved by a device according to the invention.

BRIEF DESCRIPTION OF THE DRAWINGS

The invention is described in more detail below in comparison with the appended drawing comprising the figures in which.

DESCRIPTION OF PREFERRED EMBODIMENTS

Figure 1:
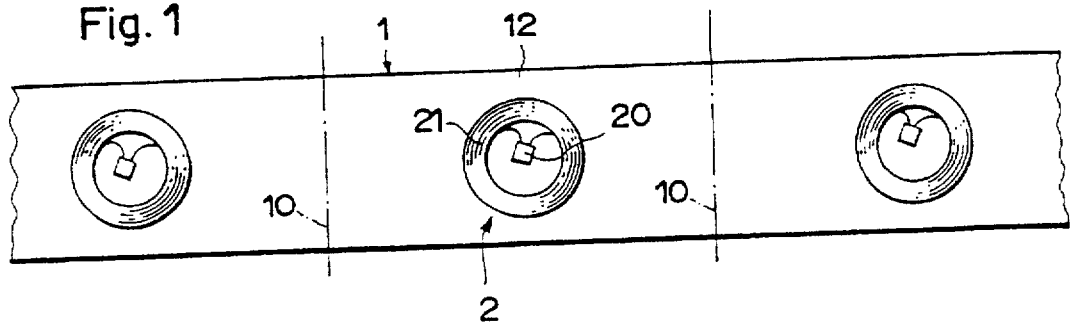
FIG. 1 depicts a strip viewed from above, comprising several marking devices according to the invention, as it leaves manufacture.

FIG. 1 shows, approximately on a scale of 1:1, a strip 1 of flexible material, preferably textile, woven or nonwoven, but also capable of being of synthetic material, on which a first layer 12 of a thermoplastic, thermoadhesive, or self-adhering material has been deposited, preferably covering the whole upper surface of the strip 1. A plurality of electronic marking circuits 2, each composed of a circuit 20 of which two metal paths are connected to the two ends of a wire formed into a winding 21, have been disposed over the first layer 12 so as to adhere to it. The strip 1 is a continuous strip on which an automatic machine disposes the marking circuits 2 at regular intervals. As is also seen in the following figures, other layers may then be deposited and applied by heat means for holding and protecting the circuits 2 on the strip 1. For the individual use of each marking device, it then suffices to separate them by cutting along the lines 10. The circuit 20 is depicted here on an enlarged scale in relation to the rest of the drawing, in general it is an electronic circuit of very small dimensions, its sides typically being less than a mm. The winding 21 comprises a plurality of turns, disposed in several layers, of a fine wire, the diameter of which is on the order of a few hundredths of a mm and forming an air-core coil, i.e., without a core. The formation of the winding 21 and the soldering of the two wires to the paths of the circuit 20 preferably takes place on an automatic machine.

Figure 2:
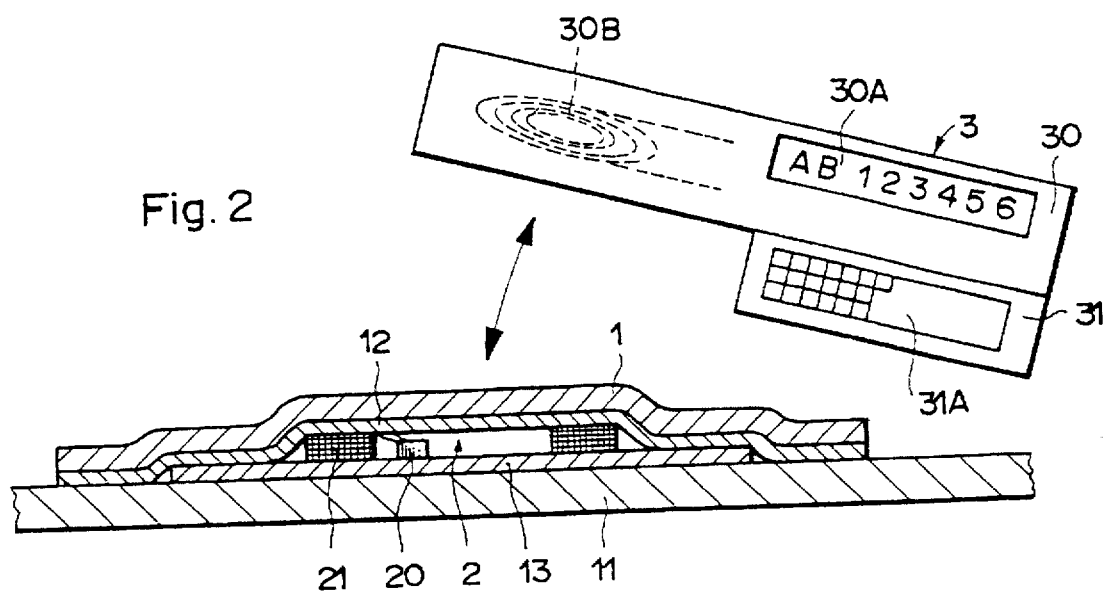
FIG. 2 depicts a first embodiment of a marking device according to the invention viewed in section, showing in particular its use.

Beside the configuration of an embodiment of the marking device, FIG. 2 also depicts diagrammatically the use of a marking device according to the invention.

A marking device has been fixed to a clothing part 11 by means which will be described below. The winding 21 depicted here in section is greatly enlarged in relation to the preceding figure. A separate apparatus 3, movable or fixed, and comprising a code-reading unit 30 and possibly a code-entering or -modifying unit 31, is depicted very schematically above the marking device, only the main elements of said apparatus being depicted.

The rental firm will preferably have a complete apparatus, i.e., equipped with the code-entering unit 31 comprising, for example, a keyboard 31A. The code, composed on the keyboard 31A, may be checked by means of the display 30A, then converted in the form of an electromagnetic signal by electronic means within the apparatus before being sent by the antenna 30B, here depicted in the form of a winding, in the direction of the marking device, where it is received by the winding 21 acting as an antenna, to be transmitted to the electronic circuit 20 in part of the memory of which it is entered. Thereafter, it will always be possible to poll the marking device by means of an apparatus 3, which possibly does not have the code-entering unit 31 but only the reading unit 30, polling again taking place via the winding 30B and reading of the code on the display 30A.

So a few advantages of the invention are already noticed, viz., the possibility of entering the code or reading it without its being necessary to reach the marking device directly other than by means of an electromagnetic signal, symbolized by an arrow in the figure, so that it is not necessary for the user to reach the label directly, the apparatus 3 being capable of entering or reading the code at a certain distance from the marking device, which distance can be from a few centimeters up to a few tens of centimeters. Moreover, the marking device is absolutely passive, i.e., it does not comprise any internal source of energy such as a battery, the electronic circuit 20 being activated by a signal coming from the apparatus 3. Another immediate advantage is that a code modification is very easy and very quick, as soon as one has an apparatus 3 equipped with an entering unit 31. It is to be noted that the entering or reading, respectively, of a code takes place only when the garment is not in the cleaning phase, that is to say that the temperature at which the marking device must operate is not critical. The only precaution to be taken is that the elements composing the electronic part of the marking device 2 withstand, in the non-active state, the temperatures necessary for fixing the device on the garment to be marked, as well as those to which the clothes are subjected during their cleaning. The ways in which these electronic parts are protected from moisture are described below.

FIG. 2 also shows a first embodiment of the marking device with the different layers ensuring its fixing to the garment, as well as its fluid-tightness.

As indicated in comparison with FIG. 1, there is first of all a portion of the flexible band 1, of textile or of synthetic material, one face of which is covered with a thermoadhesive thermoplastic fluid-tight coating 12 to which the electronic marking device 2 is fixed, which is in turn covered with another thermoadhesive thermoplastic layer 13. When it is desired to apply a marking device to a portion of a garment 11, it suffices to place said device there, the thermoplastic layer 13 being in contact with the garment 11, then to apply an iron at high temperature with a certain pressure to the top face of the portion of band 1 to cause the thermoplastic layers 12 and 13 to melt partially for causing them to adhere to the piece of clothing 11. The choice of the thermoplastic materials making up the layers 12 and 13 is important, particularly their melting point. Actually, it is of prime importance that the melting point of these layers be greater than the highest of the temperatures to which the garment will be subjected during its cleaning or ironing, respectively. On the other hand, this melting point will have to be less than the temperature at which the marking device is applied to the garment as indicated above. In addition, these thermoplastic layers must resist the products and detergents used for the cleaning. Protection of the electronic device 2 against moisture is ensured by the fluid-tightness of the layers 12 and 13, as well as by their welding at the periphery of the device 2. Instead of having thermoadhesive thermoplastic layers, the latter may be replaced by self-adhering layers, only pressure being necessary for fixing the device on the garment.

Figure 3:
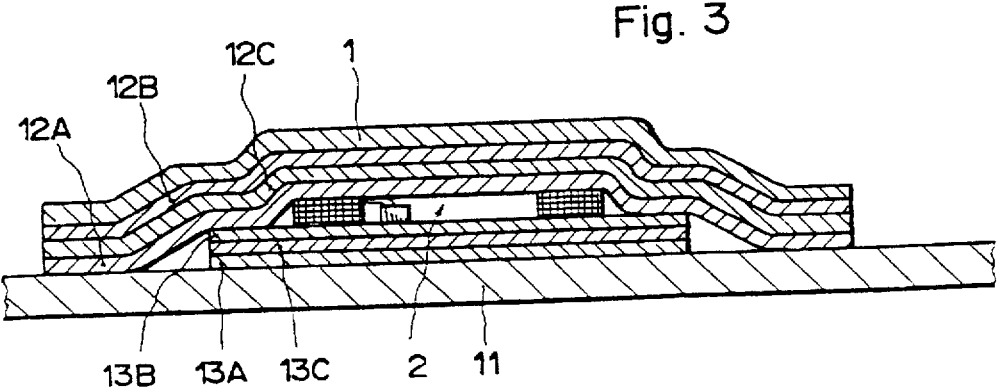
FIG. 3 depicts another embodiment of a marking device according to the invention.

Another embodiment of the marking device is seen in FIG. 3, the means permitting the fluid-tightness of the device to be ensured being improved as compared with the preceding embodiment.

The device is similar to that described previously, except that each of the thermoplastic layers is separated into two half-layers 12A and 12B, and 13A and 13B, respectively, a layer 12C and 13C of a perfectly fluid-tight non-porous material, such as polyester, for example, being interposed between each of the aforesaid half-layers, thus ensuring the transverse fluid-tightness of said layers. The radial fluid-tightness of the device is ensured by the welded joint at the edge of the circuit 2. It is obvious that other arrangements of the different layers depicted may also be envisaged in order best to ensure the fluid-tightness of the device, particularly if the piece of clothing 11 or the piece of band 1 are themselves made of a fluid-tight synthetic material, it may be possible to eliminate one or the other of the layers 12 or 13.

The thicknesses of the different layers in FIGS. 2 and 3 have been depicted in a greatly exaggerated manner in order better to distinguish them, but in fact the thermoplastic and polyester layers have thicknesses on the order of a few hundredths of a mm, so that the total thickness of the device is very small and does not significantly increase the thickness of the garment to which it is fixed.

According to a modified embodiment, it is possible not to fix the thermoplastic layer 13, having to adhere later to the piece 11 to be marked, at the time of manufacture of the device but to place a separate piece at the time of fixing of the device, the composition and the characteristics of this separate piece being chosen in order to adapt to the material of which the piece 11 to be marked is made in order best to adhere thereto.

In view of the small transverse dimensions and the slight thickness of the marking device according to the invention, it is very discreet and in no case bothers the wearer of the garment; seeing, on the other hand, that the device is relatively flexible, it does not stiffen the garment portion supporting it.

Many other uses of the marking device than that described above may be envisaged; it may also serve as a security device to avoid theft in a clothing store, the exits from the store being equipped with reading devices reacting when a garment, the security code of which has not been deactivated at the time of payment, passes nearby. The same device may also contain instructions for laundering or upkeep supplied by the manufacturer, so that when the possessor takes his garment to be cleaned in a firm equipped with a reading device, this firm can know exactly the cleaning directions. The code may be supplemented by a code part identifying the owner of the garment, particularly in the case of very valuable clothes. The qualities peculiar to the device also permit its use for objects other than clothes, e.g., for the checking of lengths of cloth and even for the marking of rigid objects.

I claim:

1. An electronic marking device for recognition of a piece of textile, said device being permanently fixed to said piece of textile to be marked, the device comprising: an electronic part made up of an electronic circuit which comprises a memory part in which a code can be stored and an antenna, said electronic part being fixed to a portion of a flexible strip by means of a first layer of one of a thermoplastic, thermoadhesive and self-adhering material, said first layer comprising a peripheral surface capable of adhering to textile to be marked under the effect of pressure and/or of heat, wherein a second layer of one of thermoplastic, thermoadhesive and self-adhering material covers the electronic part and is capable of adhering to textile to be marked under the effect of pressure and/or of heat.

2. The device according to claim 1, wherein the antenna comprises a winding, two ends of the winding being connected to two metal paths of the electronic circuit.

3. Use of the device according to claim 2 for marking a garment.

4. The device according to claim 1, wherein the memory part of the electronic circuit is programmable.

5. Use of the device according to claim 4 for marking a garment.

6. The device according to claim 1, wherein at least one of the two layers of one of thermoplastic, thermoadhesive and self-adhering material is separated into two half-layers by a layer of a material non-porous to moisture.

7. Use of the device according to claim 6 for marking a garment.

8. The device according to claim 1, wherein the composition of the second layer is chosen as a function of the material making up the object to be marked.

9. Use of the device according to claim 8 for marking a garment.

10. Use of the device according to claim 1 for a marking a garment.

* * * * *